Oct. 6, 1931.   H. V. REED   1,825,980
FRICTION CLUTCH
Filed June 2, 1927   2 Sheets-Sheet 1
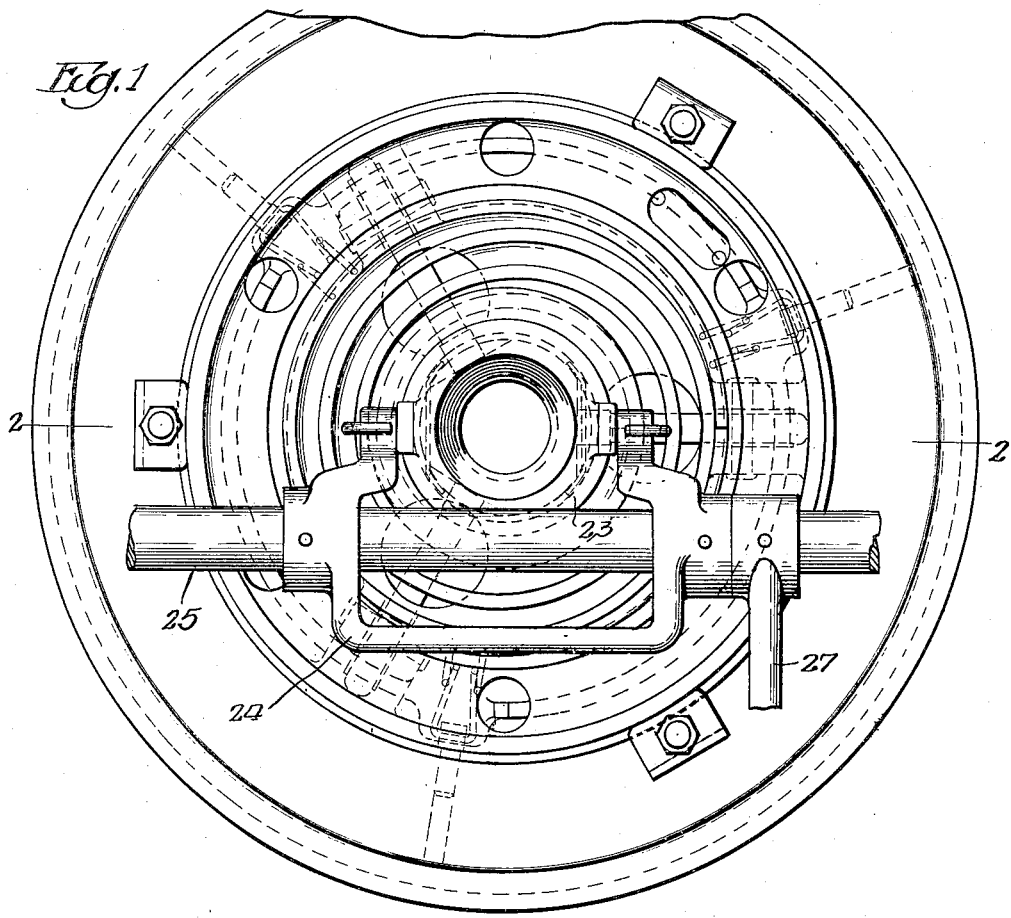
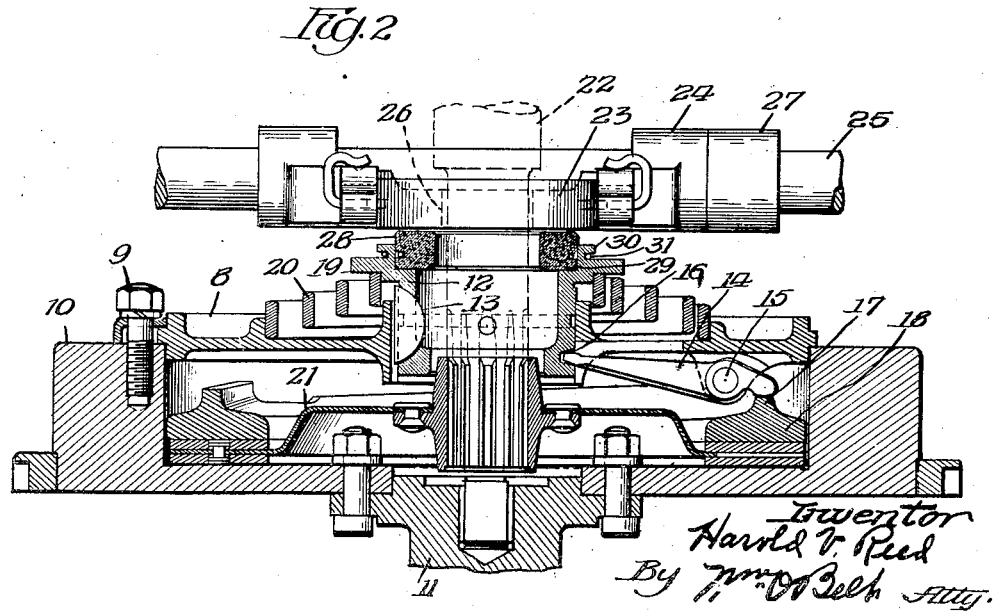

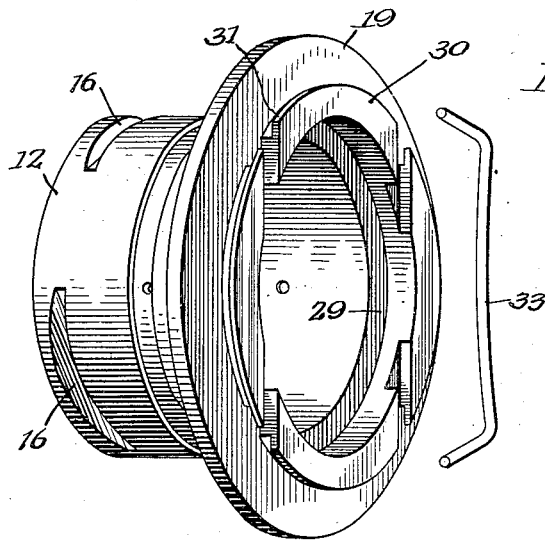
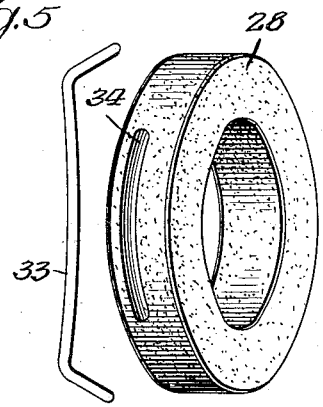
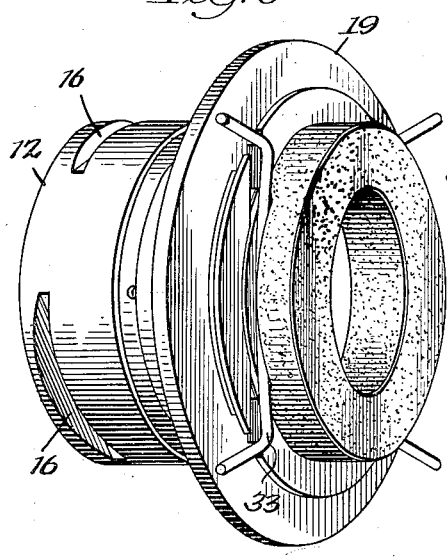
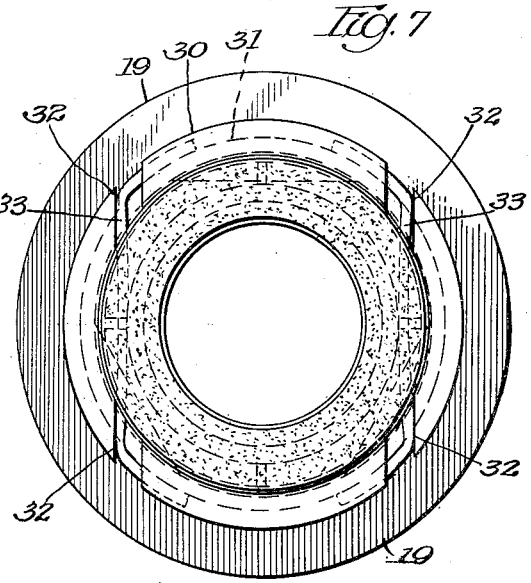

Patented Oct. 6, 1931

1,825,980

UNITED STATES PATENT OFFICE

HAROLD V. REED, OF CHICAGO, ILLINOIS, ASSIGNOR TO THE BORG & BECK COMPANY, OF CHICAGO, ILLINOIS, A CORPORATION OF ILLINOIS

FRICTION CLUTCH

Application filed June 2, 1927. Serial No. 195,990.

This invention relates to friction clutches and its object is to simplify and improve the construction and operation of a clutch by providing a novel and improved antifriction bearing between the clutch and the release device which does not require guiding means or lubrication and which is adapted to be easily replaced when renewal is required.

Another object of the invention is to mount the antifriction bearing on the clutch sleeve in position to be engaged by the release device and so that the bearing will act as an insulator to prevent the creation of excessive heat in the sleeve when the clutch spins or slips and which might interfere with the proper operation of the clutch.

And a further object of the invention is to provide simple and efficient means for securing the bearing on the sleeve and against rotation relative to the sleeve.

In the accompanying drawings illustrating a selected embodiment of the invention:

Fig. 1 is an elevation of the clutch and the release device in their operative relation.

Fig. 2 is a sectional view on the line 2, 2 of Fig. 1.

Fig. 3 is a perspective view of the sleeve.

Fig. 4 is a perspective view of the bearing.

Fig. 5 is a detail view of the two retainer wires.

Fig. 6 is a perspective view of the sleeve with the bearing mounted therein.

Fig. 7 is an elevation of the bearing end of the sleeve.

Referring to the drawings 8 is the cover plate of the clutch and it is rigidly secured by bolts 9 to the flywheel 10 which is mounted on the driving or crank shaft 11. The cover plate is mounted on the sleeve 12 and a key 13 engaging the cover plate and the sleeve causes the sleeve to revolve with the cover plate and flywheel, but permits the sleeve to slide longitudinally within and relatively to the cover plate. Clutch levers 14 are pivoted at 15 on the cover plate with their inner ends engaging recesses 16 in the sleeve and their outer ends bearing upon lugs 17 on the pressure ring 18. The sleeve is provided at its outer end with a flange 19 and a spring 20 is interposed between the cover plate and this flange and normally presses the sleeve outward thereby swinging the clutch levers on their pivots and forcing the pressure ring inward to press the friction faced clutch or driven plate 21 into operative engagement with the flywheel. The clutch or driven plate is splined on the driven shaft 22.

The clutch release device comprises a circular plate 23 removably mounted in a yoke 24 which is supported on a shaft 25. The release plate has an enlarged opening 26 to receive the driven shaft 22 and the plate is advanced to move the sleeve inward and effect release of the clutch by a lever 27.

The bearing comprises an annular ring 28 made of graphite or other suitable antifriction material and it is made to fit snugly in a seat 29 in the flanged end of the sleeve 12. The flange 19 is set back a little from the end of the sleeve to provide a shoulder 30 which is undercut by a groove 31 adjacent the flange 19. The shoulder is divided by four slots 32 which are arranged in two parallel pairs at opposite sides of the opening in the sleeve, and the slots of each pair are in alignment. The groove 31 is conveniently made continuous about the shoulder in a milling operation, but it is only essential that the groove extend a limited distance inward from each slot to receive the ends of resilient retainer wires 33, as shown in Fig. 7. The bearing 28 has oppositely disposed slots 34 which are preferably located adjacent that end of the bearing which engages the seat and these slots are arranged to align with the slots 32 in the shoulder of the sleeve.

In assembling the bearing with the sleeve the bearing is inserted partly in the end of the sleeve with the slots 34 arranged to align with the slots 32. Then the retainer wires are inserted in the slots 34 with their ends outturned. The bearing is then pressed to its seat and it carries the retainer wires into the slots 32, the ends remaining outturned substantially as shown in Fig. 6. Then the wires are turned over until the ends project inward, and pressure is applied to the ends to force them over the edges of the shoulder 30 and into the groove 31, as shown in Fig.

7. In this position the ends of the retainer wires are inturned, but they are seated in the groove so that they cannot swing outwardly to interfere with the operation of the release device or of the bearing and sleeve. In other words they are so securely engaged with the groove back of the shoulder that there is no likelihood of them ever becoming loose and disengaged under any ordinary operating conditions. When the bearing is forced from the position shown in Fig. 6 to its seat, as shown in Fig. 2, the slots 34 in the bearing will align with the slots 32 in the shoulder of the sleeve to receive the retainer wires, and these wires are preferably bowed between their ends so that they will exert a pressure upon the bearing to assist in holding it firmly against its seat. Those portions of the retainer adjacent the ends thereof will engage the outside wall of each slot 32 and the intermediate part of each retainer being engaged with the bottom wall of each slot 34, the bearing will be prevented by the engagement of the retainer wires from turning in its seat. The ends of the retainer wires are preferably bowed at such an angle that when these ends are engaged with the groove 31 they will be held at tension, and this also will assist in holding the retainer wires and the bearing in rigid position. The clutch release plate is arranged to flatly engage the front flat face of the antifriction bearing which, in the form shown has a continuous contact surface for the plate. The bearing not only provides a substantial and efficient contact for the release plate, which is noiseless in practical operation, requires no lubrication and is easily installed, but it also insulates the sleeve from the plate and avoids the production of excessive heat which might result if the sleeve operated in contact with the plate and the lubrication was insufficient.

I have shown the invention in the accompanying drawings in an embodiment which I have found suitable for the purpose, but I reserve the right to make all such changes therein as may be necessary or desirable to adapt the invention for different clutches and installations within the scope of the following claims.

I claim:

1. A sleeve for a friction clutch having an annular shoulder at one end, said shoulder being provided with a plurality of slots, an antifriction bearing arranged in the shouldered end of the sleeve and having oppositely disposed slots, and means engaging the slots in the bearing and in the shoulder for securing the bearing to the sleeve and against relative rotation on the sleeve.

2. A sleeve for a friction clutch having an annular shoulder at one end, said shoulder having oppositely disposed pairs of slots, an antifriction bearing arranged in the shouldered end of the sleeve and having oppositely disposed peripheral slots, said bearing adapted to be engaged with the shouldered end of the sleeve and with the slots in the bearing substantially aligned with the pairs of slots in the shoulder, and means engaged with said slots for securing the bearing to the sleeve and against relative rotation on the sleeve.

3. A sleeve for a friction clutch having an annular shoulder at one end, said shoulder having oppositely disposed pairs of slots, an antifriction bearing having oppositely disposed peripheral slots, said bearing adapted to be engaged with the shouldered end of the sleeve and with the slots in the bearing substantially aligned with the pairs of slots in the shoulder, and retainer wires engaged with said slots for securing the bearing to the sleeve and against relative rotation on the sleeve.

4. A sleeve for a friction clutch having an annular shoulder at one end, said shoulder having oppositely disposed pairs of slots and undercut grooves leading to said slots, an antifriction bearing arranged in the shouldered end of the sleeve and having oppositely disposed peripheral slots, said bearing adapted to be engaged with the shouldered end of the sleeve and with the slots in the bearing substantially aligned with the pairs of slots in the shoulder, and retainer wires engaged with said slots and having their ends bent to engage said grooves for securing the bearing to the sleeve and against relative rotation on the sleeve.

5. A sleeve for a friction clutch having an annular shoulder at one end, said shoulder having oppositely disposed pairs of slots therein, an antifriction bearing having oppositely disposed peripheral slots, said bearing adapted to be engaged with the shouldered end of the sleeve and with the slots in the bearing substantially aligned with the pairs of slots in the shoulder, and tension means engaged with said slots for securing the bearing to the sleeve and against relative rotation on the sleeve.

6. A sleeve for a friction clutch having an annular shoulder at one end, an antifriction bearing arranged in the shouldered end of the sleeve, and oppositely disposed means engaging the peripheral part of said bearing and said shoulder for securing the bearing to the sleeve and against relative rotation on the sleeve.

7. The combination of a lever operating sleeve of a friction clutch and an annular clutch release plate, of an annular composition bearing rigidly secured in the end of the sleeve for engagement with the plate, and resilient means on the sleeve for detachably securing the bearing therein.

8. The combination of a lever operating sleeve of a friction clutch and an annular clutch release plate, said sleeve having an annular seat in one end thereof, of an annular composition bearing in said seat for engagement with the plate, and resilient means on the sleeve engaging the bearing at the periphery thereof for securing the bearing rigidly in the seat.

9. The combination of a lever operating sleeve of a friction clutch and an annular clutch release plate, said sleeve having an annular seat in one end thereof, of an annular composition bearing in said seat for engagement with the plate, and retainer wires detachably engaging the sleeve and the bearing for holding the bearing rigidly in said seat.

10. The combination of a lever operating sleeve of a friction clutch and an annular clutch release plate, said sleeve having an annular seat in one end thereof, of an annular composition bearing in said seat for engagement with the plate, and means detachably engaging the bearing at the periphery thereof and the sleeve for securing the bearing against relative movement in the sleeve.

HAROLD V. REED.